United States Patent
Das et al.

(10) Patent No.: US 11,814,085 B2
(45) Date of Patent: Nov. 14, 2023

(54) SYSTEM FOR GRID-BASED MERGE CUT-IN PREDICTION AND METHOD THEREOF

(71) Applicant: KPIT TECHNOLOGIES LIMITED, Pune (IN)

(72) Inventors: Soumyo Das, Pune (IN); Ashutosh Sharma, Pune (IN); Rastri Dey, Pune (IN); Srinath Shankarappa Budhavaram, Pune (IN)

(73) Assignee: KPIT TECHNOLOGIES LIMITED, Pune (IN)

( * ) Notice: Subject to any disclaimer, the term of this patent is extended or adjusted under 35 U.S.C. 154(b) by 333 days.

(21) Appl. No.: 17/214,130

(22) Filed: Mar. 26, 2021

(65) Prior Publication Data
US 2021/0237779 A1 Aug. 5, 2021

Related U.S. Application Data

(63) Continuation of application No. PCT/IB2019/055877, filed on Jul. 10, 2019.

(30) Foreign Application Priority Data

Sep. 27, 2018 (IN) .............................. 201821036581

(51) Int. Cl.
B60W 60/00 (2020.01)
B60W 40/09 (2012.01)

(52) U.S. Cl.
CPC ...... *B60W 60/00274* (2020.02); *B60W 40/09* (2013.01); *B60W 60/00272* (2020.02);
(Continued)

(58) Field of Classification Search
CPC ........... B60W 60/00274; B60W 40/09; B60W 60/00272; B60W 2554/4045; B60W 2554/4049
See application file for complete search history.

(56) References Cited

U.S. PATENT DOCUMENTS

2018/0182238 A1* 6/2018 Fowe ................... G08G 1/0112

FOREIGN PATENT DOCUMENTS

DE     10 2012 008 659     11/2012

OTHER PUBLICATIONS

Quoc Huy Do et al., Human Drivers Based Active-Passive Model for Automated Lane Change, Jan. 19, 2017. IEEE Intelligent Transportation Systems Magazine, pp. 42-56. (Year: 2017).*

(Continued)

*Primary Examiner* — James J Lee
*Assistant Examiner* — Jonathan E Reinert
(74) *Attorney, Agent, or Firm* — FOLEY & LARDNER LLP

(57) ABSTRACT

A prediction system implemented in a host vehicle to predict a merge cut-in for an autonomous vehicle. The system comprises an input unit for capturing neighboring information of the host vehicle, and a processing unit to receive the captured neighboring information and generate a grid map by determining shape and dimensions of a grid, estimate trajectory of each target vehicle of the one or more target vehicles, based on a driver behavior model of each target vehicle, to determine optimized path of each target vehicle, and generate a global maneuver model by analyzing motion of each neighboring target vehicle, wherein on generation of the global maneuver model a merge cut-in threat for the host vehicle is computed by performing centralized risk management and utilizing the predicted trajectory of the one or more target vehicles.

20 Claims, 12 Drawing Sheets

(52) U.S. Cl.
CPC ............... *B60W 2554/4045* (2020.02); *B60W 2554/4049* (2020.02)

(56) References Cited

OTHER PUBLICATIONS

Do Quoc Huy et al., Human Drivers Based Active-Passive Model for Automated Lane Change dated Jan. 19, 2017 2 pages.
International Search Report PCT/IB2019/055877 dated Nov. 21, 2019 4 pages.
Liu Peng et al., Trajectory Prediction of a Lane Changing Vehicle Based On Driver Behavior Estimation and Classification dated Oct. 8, 2014 6 pages.

* cited by examiner

FIG. 3B

|  | Cn | . . C3 | C2 | C1 | C1 | C2 | . . | Cn |
|---|---|---|---|---|---|---|---|---|
| Rm | RmCnQ2 | . . | RmC2Q2 | RmC1Q2 | RmC1Q1 | RmC2Q1 | . . | RmCnQ1 |
| R3 | R3CnQ2 | . . | R3C2Q2 | R3C1Q2 | R3C1Q1 | R3C2Q1 | . . | R3CnQ1 |
| R2 | R2CnQ2 | . . | R2C2Q2 | R2C1Q2 | R2C1Q1 | R2C2Q1 | . . | R2CnQ1 |
| R1 | R1CnQ2 | . . | R1C2Q2 | R1C1Q2 | R1C1Q1 | R1C2Q1 | . . | R1CnQ1 |
| R1 | R1CnQ3 | . . | R1C2Q3 | R1C1Q3 | R1C1Q4 | R1C2Q4 | . . | R1CnQ4 |
| R2 | R2CnQ3 | . . | R2C2Q3 | R2C1Q3 | R2C1Q4 | R2C2Q4 | . . | R2CnQ4 |
| R3 | R3CnQ3 | . . | R3C2Q3 | R3C1Q3 | R3C1Q4 | R3C2Q4 | . . | R3CnQ4 |
| Rm | RmCnQ3 | . . | RmC2Q3 | RmC1Q3 | RmC1Q4 | RmC2Q4 | . . | RmCnQ4 |

Rm → Row number of Grid
Cn → Column number of Grid
Q1 → Quadrant number of Grid
● → Reference co-ordinate position on host vehicle (origin of grid)

FIG. 3C

|  | Cn | . . C3 | C2 | C1 | C1 | C2 | . . | Cn |
|---|---|---|---|---|---|---|---|---|
| R(m + k) | R(m + k)CnQ2 | . . | R(m + k)C2Q2 | R(m + k)C1Q2 | R(m + k)C1Q1 | R(m + k)C2Q1 | . . | R(m + k)CnQ1 |
| R3 | R3CnQ2 | . . | R3C2Q2 | R3C1Q2 | R3C1Q1 | R3C2Q1 | . . | R3CnQ1 |
| R2 | R2CnQ2 | . . | R2C2Q2 | R2C1Q2 | R2C1Q1 | R2C2Q1 | . . | R2CnQ1 |
| R1 | R1CnQ2 | . . | R1C2Q2 | R1C1Q2 | R1C1Q1 | R1C2Q1 | . . | R1CnQ1 |
| R1 | R1CnQ3 | . . | R1C2Q3 | R1C1Q3 | R1C1Q4 | R1C2Q4 | . . | R1CnQ4 |
| R2 | R2CnQ3 | . . | R2C2Q3 | R2C1Q3 | R2C1Q4 | R2C2Q4 | . . | R2CnQ4 |
| R3 | R3CnQ3 | . . | R3C2Q3 | R3C1Q3 | R3C1Q4 | R3C2Q4 | . . | R3CnQ4 |
| Rm | RmCnQ3 | . . | RmC2Q3 | RmC1Q3 | RmC1Q4 | RmC2Q4 | . . | RmCnQ4 |

Rm → Row number of Grid
Cn → Column number of Grid
Q1 → Quadrant number of Grid
k → Additional row/column in Grid
● → Reference co-ordinate position on host vehicle (origin of grid)

High Primary Threat

SYSTEM FOR GRID-BASED MERGE CUT-IN PREDICTION AND METHOD THEREOF

CROSS-REFERENCE TO RELATED APPLICATIONS

This application is a continuation of International Patent Application No. PCT/IB2019/055877, filed Jul. 10, 2019, which claims the benefit of and priority to Indian Patent Application No. 201821036581, filed Sep. 27, 2018, the disclosures of each of which are hereby incorporated by reference in their entirety.

TECHNICAL FIELD

The present invention generally relates to vehicle automation and, more particularly to systems and methods for facilitating vehicle manoeuvring in merge cut-in scenario.

BACKGROUND

Autonomous vehicles facilitate unmanned navigation and self-executed functional operations of the vehicles in complex traffic conditions. Safety being a primary factor of importance for the autonomous vehicles; the vehicles are programmed to operate at posted speed limits, flawlessly observe traffic rules and interact with other vehicles. Yet doing so in heavy traffic, on highways and in urban settings without an ability to negotiate with other target vehicles would doom the automated vehicles to sit idle, awaiting for an opportunity to merge that may never arise.

As a known fact driving in crowded roads always jeopardize the comfort of the passengers/driver while manoeuvring in a competitive environment as target or surrounding vehicles from different lanes ease to an ego lane while lane changing, leading to competition and need for a precise estimation approach for determining the target vehicles around the host vehicle to facilitate smooth lane transition.

Various methods and techniques have been developed to overcome the problem of the unmanned vehicle manoeuvring during cut-in scenario. In existing solutions, the cut-in decision is solely based on Bayes theory and ignores complexity of the cut-in due to incidence or threat of the target vehicles. Also, the problem of trajectory and risk management has been addressed in a localized form. In addition, the available solutions have a static grid whose dimensions are always fixed leading to limitation of assessment of the target vehicles for merge cut-in.

There is therefore a need in the art to provide systems and methods for merge management and threat assessment that overcomes above-mentioned and other limitations of the existing solutions and utilize robust, accurate and efficient techniques.

SUMMARY

The present disclosure relates to a system and method for easing simultaneous lane change for multiple vehicles in a crowded scenario.

According to an aspect of the present disclosure, a prediction system implemented in a host vehicle comprises: an input unit comprising one or more sensors to capture neighboring information of the host vehicle, the neighboring information comprising information of one or more target vehicles and information of surroundings, in proximity of the host vehicle, wherein the host vehicle is positioned in a lane of a road; and a processing unit comprising a processor coupled with a memory, the memory storing the instructions executable by the processor to: receive the captured neighboring information from the input unit; generate a grid map by determining dimensions of a grid based on analysis of any or a combination of the captured neighboring information and one or more attributes of the host vehicle; estimate trajectory of each target vehicle of the one or more target vehicles, based on driver behavior model of each target vehicle, to determine optimized path of each target vehicle, wherein dimensions of the grid are updated based on said estimation; and generate a global maneuver model by analyzing motion of each target vehicle based selection of a model classifier for each target vehicle, wherein the model classifier is selected by analyzing the predicted trajectory of each target vehicle, and wherein on generation of the global maneuver model a merge cut-in threat for the host vehicle is computed by performing threat assessment and utilizing the predicted trajectory of the one or more target vehicles.

In an embodiment, the processor further analyzes a condition for change in merge cut-in of target vehicle based on the generated global maneuver model and environmental factors obtained from the information of the surroundings.

In an embodiment, the processor further assesses a cut-in prediction for merge management associated with centralized risk management based on the generated global maneuver model.

In an embodiment, the processor further performs adaptive grid mapping and dynamic grid sizing to dynamically alter shape and size of the grid based on the one or more attributes of the host vehicle and assesses threat by utilizing the captured neighboring information.

In an embodiment, a driver behavior model for each of the target vehicle is developed by analyzing driving parameter, lateral dynamics, longitudinal dynamics and consistency in driving profile of the target vehicle.

In an embodiment, estimation of trajectory of each of the target vehicle is further based on assessing threat due to any or a combination of neighboring situation, environmental factors, and estimated trajectories of other target vehicles, wherein said neighboring situation, environmental factors, and estimated trajectories of other target vehicles are determined by analyzing the neighboring information.

In an embodiment, length of the grid is computed based on longitudinal velocity and longitudinal acceleration of the host vehicle, width of the grid is computed based on lateral velocity and lateral acceleration of the host vehicle, and shape of the grid is computed based on lane of the host vehicle and estimated path of the host vehicle.

In an embodiment, the processor estimates trajectory of each target vehicle using a Hidden Markov Model (HMM) by: defining HMM states for the target vehicle based on driver behavior model of the target vehicle; iteratively optimizing path of the target vehicle based on feedback of the HMM model in the global maneuver model and influence of other target vehicles; and selecting a priority trajectory of the target vehicle as optimized trajectory to be maintained across the grid map for searching optimized path for other target vehicles of the one or more target vehicles in the grid map.

In an embodiment, selection of the model classifier is performed based on any or a combination of translation motion, manoeuvring motion, overtaking motion, lane change motion and unpredictable motion of the target vehicle.

In an embodiment, the prediction system performs the threat assessment that comprises assessment of threat of collision due to merge cut-in of any of the one or more the target vehicles or the host vehicle.

According to another aspect of the present disclosure, a method, carried out according to instructions stored in a computer implemented in a host vehicle, comprises: receiving neighboring information of the host vehicle from one or more sensors, the neighboring information comprising information of one or more target vehicles and information of the surroundings, in proximity of the host vehicle, wherein the host vehicle is positioned in the lane of a road; generating the grid map by determining dimensions of the grid based on analysis of any or a combination of the captured neighboring information and one or more attributes of the host vehicle; estimating trajectory of each target vehicle of the one or more target vehicles, based on driver behavior model of the each target vehicle, to determine optimized path of the each target vehicle, wherein dimensions of the grid are updated based on said estimation; and generating the global maneuver model by analyzing motion of the each target vehicle based on selection of the model classifier for the each target vehicle, wherein the model classifier is selected by analyzing the predicted trajectory of each target vehicle, and wherein on generation of the global maneuver model the merge cut-in threat for the host vehicle is computed by performing the threat assessment and utilizing the predicted trajectory of the one or more target vehicles.

Various objects, features, aspects and advantages of the present disclosure will become more apparent from the following detailed description of preferred embodiments, along with the accompanying drawing figures in which like numerals represent like features.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

Some of the objects of the present disclosure, which at least one embodiment herein satisfies are as listed herein below.

It is an object of the present disclosure to provide a system and method that focuses on evaluating merge cut-in by considering complexity of the cut-in due to incidence or threat of target vehicles.

Another object of the present disclosure is to provide a system and method for addressing trajectory and risk management globally and determining implication of globalized threat.

Yet another object of the present disclosure is to provide a system and method for facilitating a complex globalized scenario of merge management and threat assessment using an adaptive grid.

Yet another object of the present disclosure is to provide a system and method that pre-assesses trajectory of target vehicle and predicts the most optimized collision free path for the target vehicle over a period which helps to decide merge management based on the selected target.

BRIEF DESCRIPTION OF DRAWINGS

The accompanying drawings are included to provide a further understanding of the present disclosure and are incorporated in and constitute a part of this specification. The drawings illustrate exemplary embodiments of the present disclosure and, together with the description, serve to explain the principles of the present disclosure. The diagrams are for illustration only, which thus is not a limitation of the present disclosure, and wherein:

FIGS. 3A-3F illustrate exemplary implementations of an adaptive grid module in accordance with an embodiment of the present disclosure.

DETAILED DESCRIPTION

Figure 1:
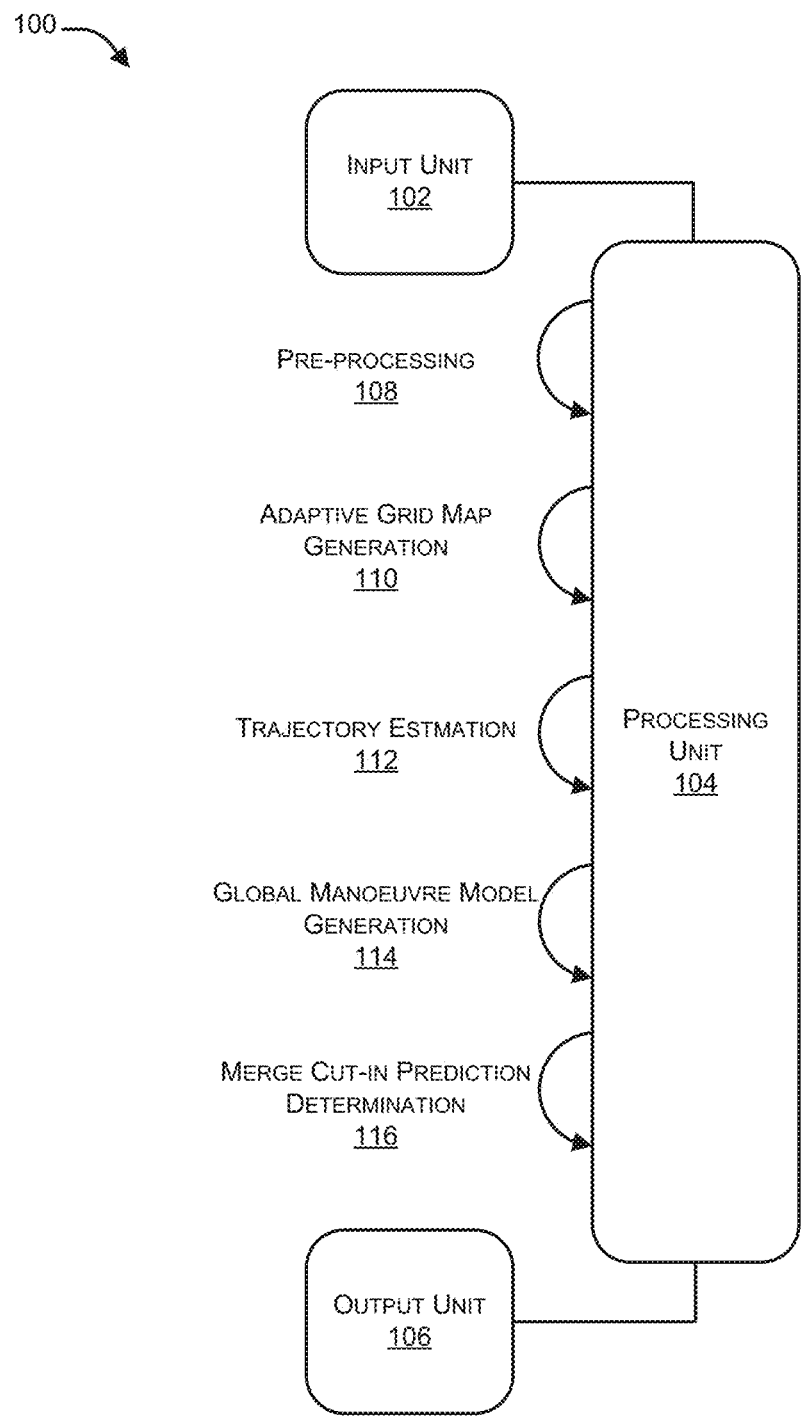
FIG. 1 illustrates an exemplary architecture of a prediction system to illustrate its overall working in accordance with an embodiment of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, and firmware and/or by human operators.

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Exemplary embodiments will now be described more fully hereinafter with reference to the accompanying drawings, in which exemplary embodiments are shown. These exemplary embodiments are provided only for illustrative purposes and so that this disclosure will be thorough and complete and will fully convey the scope of the invention to those of ordinary skill in the art. The invention disclosed may, however, be embodied in many different forms and should not be construed as limited to the embodiments set forth herein. Various modifications will be readily apparent to persons skilled in the art. The general principles defined herein may be applied to other embodiments and applications without departing from the spirit and scope of the invention. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named element.

Embodiments of the present invention may be provided as a computer program product, which may include a machine-readable storage medium tangibly embodying thereon instructions, which may be used to program a computer (or other electronic devices) to perform a process. The term "machine-readable storage medium" or "computer-readable storage medium" includes, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). A machine-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

All methods described herein may be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Various terms as used herein are shown below. To the extent a term used in a claim is not defined below, it should be given the broadest definition persons in the pertinent art have given that term as reflected in printed publications and issued patents at the time of filing.

The present disclosure relates to a system and method for easing simultaneous lane change for multiple vehicles in a crowded scenario.

According to an aspect of the present disclosure, a prediction system implemented in a host vehicle comprises: an input unit comprising one or more sensors to capture neighboring information of the host vehicle, the neighboring information comprising information of one or more target vehicles and information of surroundings, in proximity of the host vehicle, wherein the host vehicle is positioned in a lane of a road; and a processing unit comprising a processor coupled with a memory, the memory storing the instructions executable by the processor to: receive the captured neighboring information from the input unit; generate a grid map by determining dimensions of a grid based on analysis of any or a combination of the captured neighboring information and one or more attributes of the host vehicle; estimate trajectory of each target vehicle of the one or more target vehicles, based on driver behavior model of each target vehicle, to determine optimized path of each target vehicle, wherein dimensions of the grid are updated based on said estimation; and generate a global maneuver model by analyzing motion of each target vehicle based selection of a driver behavioral model for each target vehicle, wherein the driver behavioral model is selected by analyzing the predicted trajectory of each target vehicle, and wherein on generation of the global maneuver model a merge cut-in threat for the host vehicle is computed by performing threat assessment and utilizing the predicted trajectory of the one or more target vehicles.

In an embodiment, the processor further analyzes a condition for change in merge cut-in of target vehicle based on the generated global maneuver model and environmental factors obtained from the information of the surroundings.

In an embodiment, the processor further assesses a merge cut-in prediction for merge management based on the generated global maneuver model and situation classification.

In an embodiment, the processor further performs adaptive grid mapping and dynamic grid sizing to dynamically alter shape and size of the grid based on the one or more attributes of the host vehicle and assesses threat by utilizing the captured neighboring information.

In an embodiment, a driver behavior model for each of the target vehicle is developed by analyzing lateral dynamics, longitudinal dynamics and consistency in driving profile of the target vehicle.

In an embodiment, estimation of trajectory of each of the target vehicle is further based on assessing threat due to any or a combination of neighboring situation, environmental factors, and estimated trajectories of other target vehicles, wherein said neighboring situation, environmental factors, and estimated trajectories of other target vehicles are determined by analyzing the neighboring information.

In an embodiment, length of the grid is computed based on longitudinal velocity and longitudinal acceleration of the host vehicle, width of the grid is computed based on lateral velocity and lateral acceleration of the host vehicle, and shape of the grid is computed based on lane of the host vehicle and estimated path of the host vehicle.

In an embodiment, the processor estimates trajectory of each target vehicle using a Hidden Markov Model (HMM) by: defining HMM states for the target vehicle based on driver behavior model of the target vehicle; iteratively optimizing path of the target vehicle based on feedback of the HMM model from the global maneuver model and influence of other target vehicles; and selecting a priority trajectory of the target vehicle as optimized trajectory to be maintained across the grid map for searching optimized path for other target vehicles of the one or more target vehicles in the grid map.

In an embodiment, selection of the model classifier is performed based on any or a combination of translation motion, manoeuvring motion, overtaking motion, lane change motion and unpredictable motion of the target vehicle.

In an embodiment, the prediction system performs the threat assessment that comprises assessment of threat of collision due to merge cut-in of any of the one or more the target vehicles or the host vehicle.

According to another aspect of the present disclosure, a method, carried out according to instructions stored in a computer implemented in a host vehicle, comprises: receiving neighboring information of the host vehicle from one or more sensors, the neighboring information comprising information of one or more target vehicles and information of the surroundings, in proximity of the host vehicle, wherein the host vehicle is positioned in the lane of a road; generating the grid map by determining dimensions of the grid based on analysis of any or a combination of the captured neighboring information and one or more attributes of the host vehicle; estimating trajectory of each target vehicle of the one or more target vehicles, based on driver behavior model of the each target vehicle, to determine optimized path of the each target vehicle, wherein dimensions of the grid are updated based on said estimation; and generating the global maneuver model by analyzing motion of the each target vehicle based on selection of the model classifier for the each target vehicle, wherein the model classifier is selected by analyzing the predicted trajectory of each target vehicle, and wherein on generation of the global maneuver model the merge cut-in threat for the host vehicle is computed by performing the threat assessment and utilizing the predicted trajectory of the one or more target vehicles.

FIG. 1 illustrates an exemplary architecture of a prediction system to illustrate its overall working in accordance with an embodiment of the present disclosure.

According to an embodiment, a prediction system 100 is implemented in a host vehicle (also represented as HV), which may be positioned in a lane of a road, includes an input unit 102, a processing unit 104 and an output unit 106. The input unit 102 may comprise sensors configured in a vehicle to capture neighboring information of the host vehicle. The neighboring information comprises information of target vehicles (also represented as TVs) present in proximity of the vehicle as well as information of the surroundings, which may comprise information pertaining to trees, poles, roads, traffic signs, etc. The sensors may comprise, but are not limited to, radio detection and ranging (RADAR) sensor, light detection and ranging (LIDAR) sensor, image sensor, camera, and the like to capture neighboring information of the host vehicle. In an embodiment, the sensors may comprise wireless receivers to receive information directly from target vehicles and road side units (RSUs), which are in proximity of the host vehicle. The processing unit 104 may comprise a processor and a memory. In an implementation the processing unit 104 may be integrated with existing systems and controls of a vehicle to form an advanced driver assistance system (ADAS), or augment an existing ADAS. For instance, signals generated by the processing unit 104 may be sent to engine control unit (ECU) of the host vehicle and may aid in precise estimation of the target vehicles around the host vehicle to facilitate smooth lane transition. The output unit 106 may be a display device or any other audio-visual device that provides most optimized collision free target vehicle path, which may be determined by the processing unit 104.

According to an embodiment, the processing unit 104 performs pre-processing 108, during which the processing unit 104 receives neighboring information from various sensors and focuses on collating the received information that may aid in creation of a grid map.

In an embodiment, the processing unit 104 performs adaptive grid map generation 110 to create and initialize the adaptive grid map. Dimensions of a grid are determined based on analysis of any or a combination of the captured neighboring information and one or more attributes of the host vehicle.

In an embodiment, the processing unit 104 performs trajectory estimation 112 to estimate trajectory information of the target vehicle based on driving profile of the target vehicle such that a path of each target vehicle is determined. Further, dimensions of the grid are updated based on the estimation of trajectories of various target vehicles.

In an embodiment, the processing unit 104 performs global maneuver model generation 114 to generate a global maneuver model that facilitates prediction and optimised path of the target vehicles based on predictive threat assessment and collaborative movement of neighboring target vehicles.

In an embodiment, the processing unit 104 performs merge cut-in prediction determination 116 for situation classification by analyzing a feasible condition for the merge cut-in based on multiple situational and environmental factors.

Those skilled in the art would appreciate that the present disclosure provides an adaptive grid based approach that focuses on map creation of neighborhood of the host vehicle based on information of vehicles and surroundings captured from multiple sensors like radar, LIDAR, camera and further from cloud or e-horizon. The adaptive grid formation is subsequently supported by probabilistic estimation of trajectory of one or more target vehicles in adjacent lanes that pose as a threat to the host vehicle during the lane changing. The grid is followed with formulation of a Bayesian network on the road junction to properly estimate the risk while manoeuvring from ego lane (current driving lane of the host vehicle/main lane) to a desired lane using automated dynamic path generation.

In an embodiment, the trajectory of the host vehicle essentially does not follow linear extrapolation of the vehicle, and it mostly includes a higher order polynomial equation of non-linear system to create the proper trajectory of the host vehicle.

In an embodiment, major discretion of the prediction system deals with situation assessment of the road and traffic conditions. The situation assessment essentially includes driving profile, manoeuvring objective, vehicle dynamics and motion profile, capturing and considering the traffic rules of the place e.g. indication while manoeuvring assessment of the target vehicles, to maintain required headway gap and ego or adjacent lane information. Vehicle dynamics include lateral and longitudinal dynamics of the vehicle, which refer to acceleration and velocity for lateral and longitudinal movement respectively.

In an embodiment, major discretion of the prediction system additionally focuses on global manoeuvring decision based on the road dimension, global traffic condition and competitive environment of the multiple lanes.

One skilled in the art would appreciate that the system 100 provides the merge cut-in that help tackle efficiently complex real scenario of highways by considering complex conditions while the target vehicle navigating in complete autonomous or semi-autonomous mode of ACC or AEB or longitudinal control.

Figure 2:
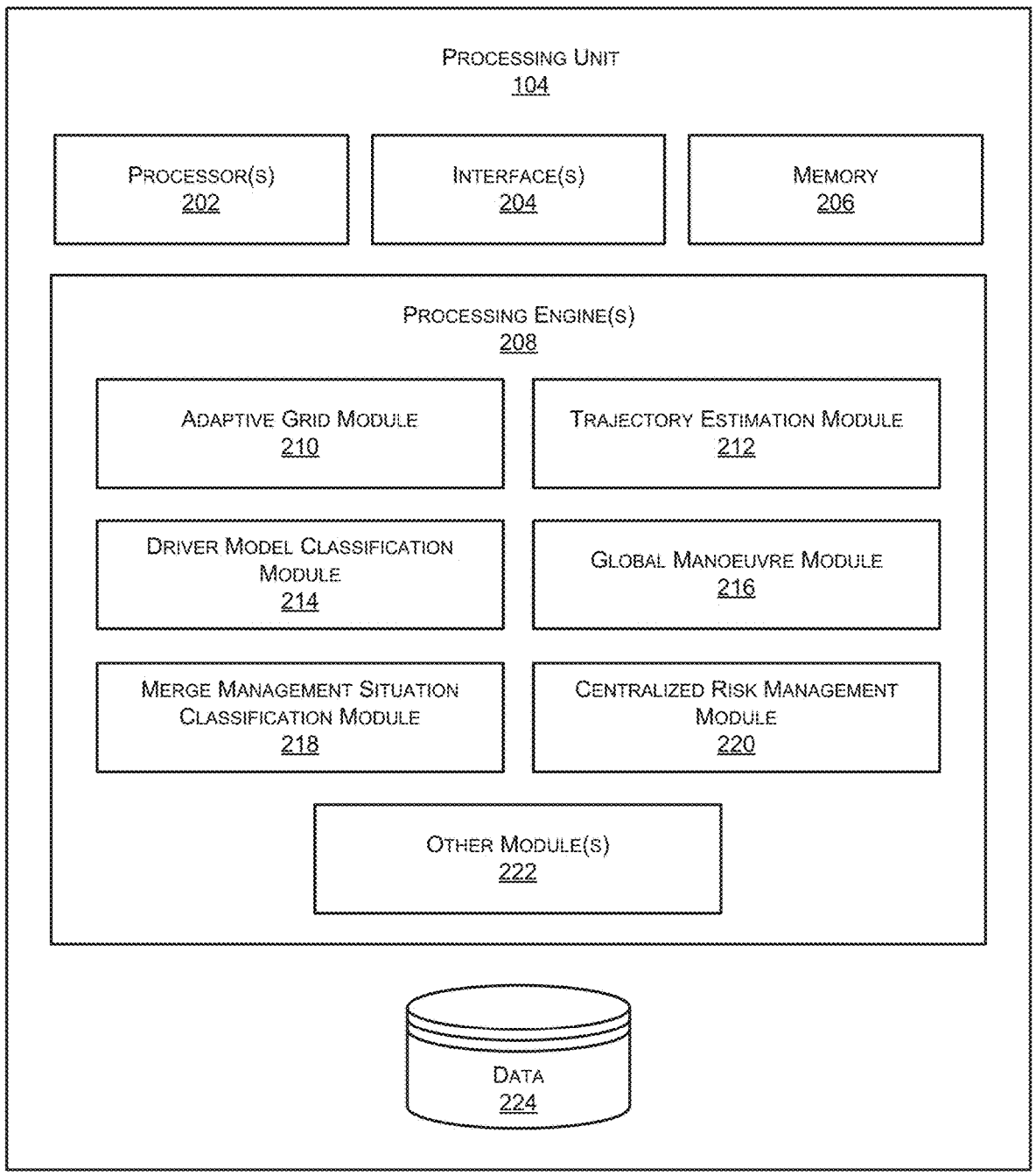
FIG. 2 illustrates exemplary modules of a processing unit in accordance with an embodiment of the present disclosure.

FIG. 2 illustrates exemplary modules of a processing unit in accordance with an embodiment of the present disclosure.

In an aspect, the processing unit 104 may comprise one or more processor(s) 202. The one or more processor(s) 202 may be implemented as one or more microprocessors, microcomputers, microcontrollers, digital signal processors, central processing units, logic circuitries, and/or any devices that manipulate data based on operational instructions. Among other capabilities, the one or more processor(s) 202 are configured to fetch and execute computer-readable instructions stored in a memory 206 of the processing unit 104. The memory 206 may store one or more computer-readable instructions or routines, which may be fetched and executed to create or share the data units over a network service. The memory 206 may include any non-transitory storage device including, for example, volatile memory such as RAM, or non-volatile memory such as EPROM, flash memory, and the like.

The processing unit 104 may also comprise an interface(s) 204. The interface(s) 204 may comprise a variety of interfaces, for example, interfaces for data input and output devices, referred to as I/O devices, storage devices, and the like. The interface(s) 204 may facilitate communication of processing unit 104 with various devices coupled to the processing unit 104 such as the input unit 102 and the output unit 106. The interface(s) 204 may also provide a communication pathway for one or more components of the processing unit 104. Examples of such components include, but are not limited to, processing engine(s) 208 and data 224.

The processing engine(s) 208 may be implemented as a combination of hardware and programming (for example, programmable instructions) to implement one or more functionalities of the processing engine(s) 208. In examples described herein, such combinations of hardware and programming may be implemented in several different ways. For example, the programming for the processing engine(s) 208 may be processor executable instructions stored on a non-transitory machine-readable storage medium and the hardware for the processing engine(s) 208 may comprise a processing resource (for example, one or more processors), to execute such instructions. In the present examples, the machine-readable storage medium may store instructions that, when executed by the processing resource, implement the processing engine(s) 208. In such examples, the processing unit 104 may include the machine-readable storage medium storing the instructions and the processing resource to execute the instructions, or the machine-readable storage medium may be separate but accessible to processing unit 104 and the processing resource. In other examples, the processing engine(s) 208 may be implemented by electronic circuitry.

The data 224 may comprise data that is either stored or generated as a result of functionalities implemented by any of the components of the processing engine(s) 208.

In an exemplary embodiment, the processing engine(s) 208 may comprise an adaptive grid module 210, a trajectory estimation module 212, a driver model classification module 214, a global maneuver module 216, a merge management situation classification module 218, a centralized risk management module 220 and other module(s) 222. Other module(s) 222 can implement functionalities that supplement applications or functions performed by processing engine(s) 208.

It would be appreciated that modules being described are only exemplary modules and any other module or sub-module may be included as part of the system 100 or the processing unit 104. These modules too may be merged or divided into super-modules or sub-modules as may be configured.

Adaptive Grid Module 210

According to an embodiment, adaptive grid module 210 generates a grid map based on analysis of the captured neighboring information and attributes of the host vehicle. Those skilled in the art would appreciate that the grid map of the present disclosure is adaptive in nature, thus, shape and size of the grid may change dynamically based on various data that is gathered during various stages of the present invention. The adaptive grid mapping and dynamic grid sizing is performed to dynamically alter shape and size of the grid based on one or more attributes of the host vehicle and assessing threat by utilizing the captured neighboring information. Further, in an example, length of the grid may be computed based on longitudinal velocity and longitudinal acceleration of the host vehicle, width of the grid may be computed based on lateral velocity and lateral acceleration of the host vehicle, and shape of the grid may be computed based on lane of the host vehicle and estimated path of the host vehicle.

FIGS. 3A-3F illustrate exemplary implementations of the adaptive grid module 210 in accordance with an embodiment of the present disclosure.

Figure 3A:
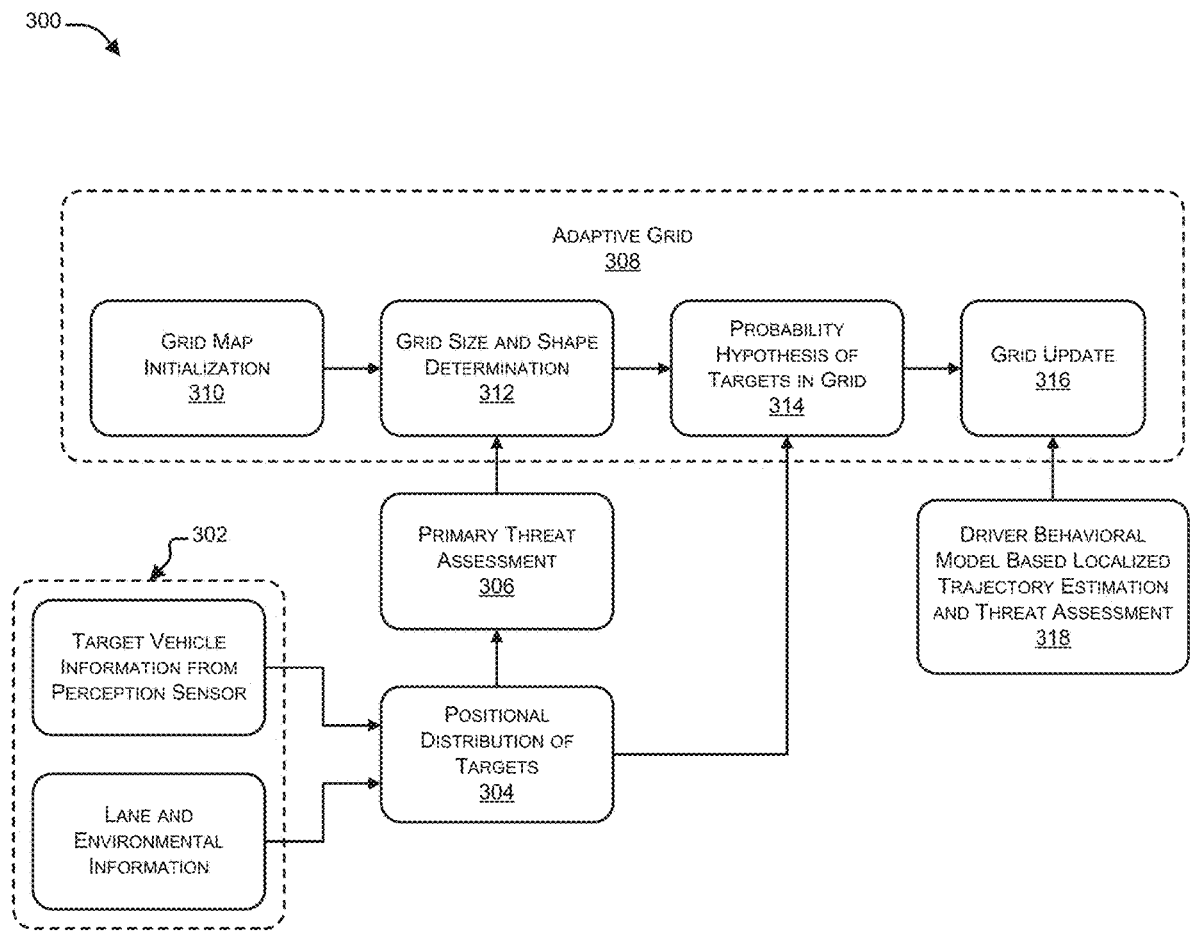

FIG. 3A is a process flow diagram illustrating exemplary working of the adaptive grid module 210 in accordance with an embodiment of the present disclosure.

At block 302, the adaptive grid module 210 receives neighboring information from various sensors configured with the host vehicle such as radar, LIDAR, camera and wireless trans-receiver. The neighboring information may include information of target vehicles as well as information of surroundings that includes lane and environmental information.

In an embodiment, at block 310, the adaptive grid module 210 initializes a grid map, and at block 312, the adaptive grid module 210 determines size and shape of the grid map. In an embodiment, length of the grid is determined by a function of time gap set by an administrator, and width of the grid is a function of distance of the vehicles in neighbourhood and the lane information. In an embodiment, the grid shape is dependent on the available lane information and a path to be proceeded by the vehicle. Further, in an embodiment the grid shape is defined as a function of trajectory of the host vehicle which may be determined from host vehicle steer angle, lane information or threat of the target vehicles in the environment and grid updates based on orientation.

In an embodiment, at block 304, the positional distribution of the target vehicles is captured by sensors. Further, the primary threat information of the target vehicles, which may be determined by primary threat assessment at block 306, based on positions distribution information of the target vehicles or position of target vehicles, which intermittently computes time to collision of target vehicles with host vehicle as primary threat based on an instantaneous information from sensors, may be utilized, at block 312, by the adaptive grid module 210 to alter shape and size of the grid. In an embodiment, at block 314, the shape and size of the grid may be compared with the determined primary trajectories using positional distribution of the target vehicles to determine probability hypothesis of the target vehicles in grid such that, at block 316, the grid is dynamically updated based on driver behavior model based localized trajectory and threat assessment at block 318

In an embodiment, the detailed analysis of the trajectory history of a target vehicle starts from the time the target vehicle enters the grid and is deleted from memory once the target vehicle leaves the grid; and thereby position distribution of the target vehicles on grid is established. This further reduces the computation burden on the ECU.

Those skilled in the art would appreciate that the grid is adaptive in nature and may be continuously updated as:
  a) width of the grid is adapted as a function of lateral velocity and acceleration of the host vehicle, and
  b) length of the grid is adapted as a function of longitudinal velocity and acceleration of the host vehicle.

Thus, width and length of the grid is computed and determined as:

$$L_{PG} = (Vx_{HV} * Thr_{LonSTG}) + (0.5 * ax_{HV} * (Thr_{LonSTG})^2)$$

$$W_{PG} = (Vy_{HV} * \sqrt{(W_{Lane}/Thr_{ay})}) + ((0.5 * ay_{HV} * W_{Lane})/Thr_{ay})$$

where,
$L_{PG}$→Length of primary grid
$W_{PG}$→Width of primary grid
$Vx_{HV}$→Longitudinal velocity of host vehicle
$Vy_{HV}$→Lateral velocity of host vehicle
$ax_{HV}$→Longitudinal acceleration of host vehicle
$ay_{HV}$→Lateral acceleration of host vehicle
$Thr_{LonSTG}$→Threshold for longitudinal set time gap
$Thr_{ay}$→Threshold for lateral acceleration
$W_{Lane}$→Threshold width considering adjacent lanes Further, shape of the grid is dependent on the available lane information and estimated path of the host vehicle. Further, the grid shape is dependent on steer angle of the host vehicle when the path the host vehicle needs to travel is not available. The grid is oriented with respect to the orientation of the host vehicle. Thus, shape of the grid is determined as:

$$S_{Grid} = \text{function}(Traj_{HV}, Px_{PT}, Py_{PT}, N_L, N_W, PTAF)$$

where,
PTAF→Primary threat availability factor
(1 stands for availability of primary threat and 0 stands for unavailability of primary threat)
$N_L$→Normalized weightage factor of Primary threat in longitudinal direction
$N_W$→Normalized weightage factor of Primary threat in lateral direction
$Px_{PT}$→Distance of primary threat in longitudinal direction
$Py_{PT}$→Distance of primary threat in lateral direction
$Traj_{HV}$→Trajectory of host vehicle In context of the present example, the dimensions of the grid are further updated based on primary grid dimension and position of primary threat therefore:

$$L_{Grid} = L_{PG} + PTAF * N_L * Px_{PT}$$

$$W_{Grid} = W_{PG} + PTAF * N_w * Py_{PT}$$

where,
$L_{Grid}$→Length of grid
$W_{Grid}$→Width of grid
$S_{Grid}$→Shape of grid The length, width and shape of grid are limited to the following:
  a) maximum dimension is pre-defined based on sensor range and field of view, and b) minimum dimension is pre-defined based on criticality of the application and computation burden.

Figures 3D, 3E:
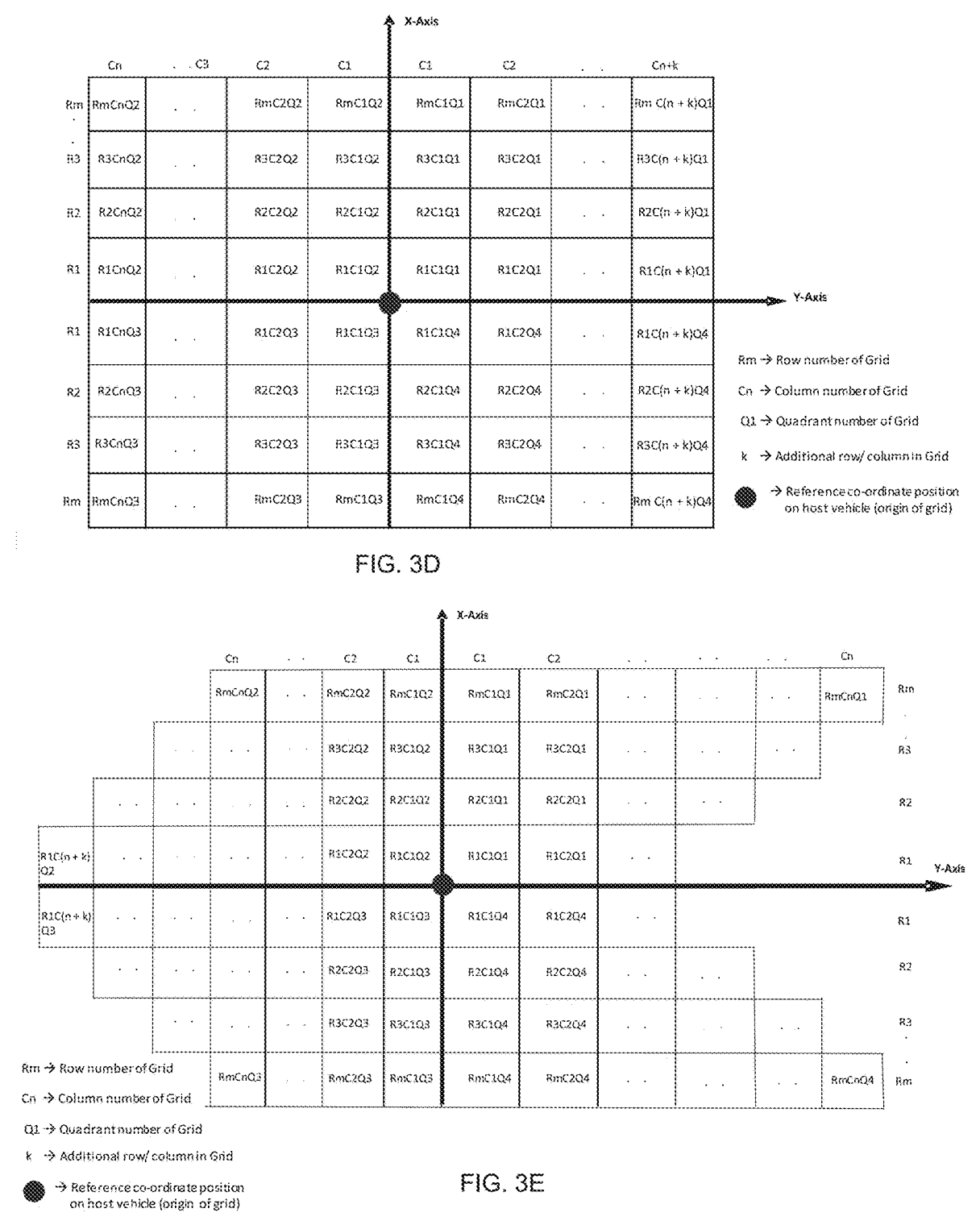

In an embodiment, FIG. 3B illustrates an initialized grid. FIG. 3C illustrates an adaptive grid with longitudinal acceleration motion of the host vehicle. FIG. 3D illustrates an adaptive grid with the lateral acceleration of the host vehicle towards right. FIG. 3E illustrates an adaptive grid with manoeuvring motion of the host vehicle.

Figure 3F:
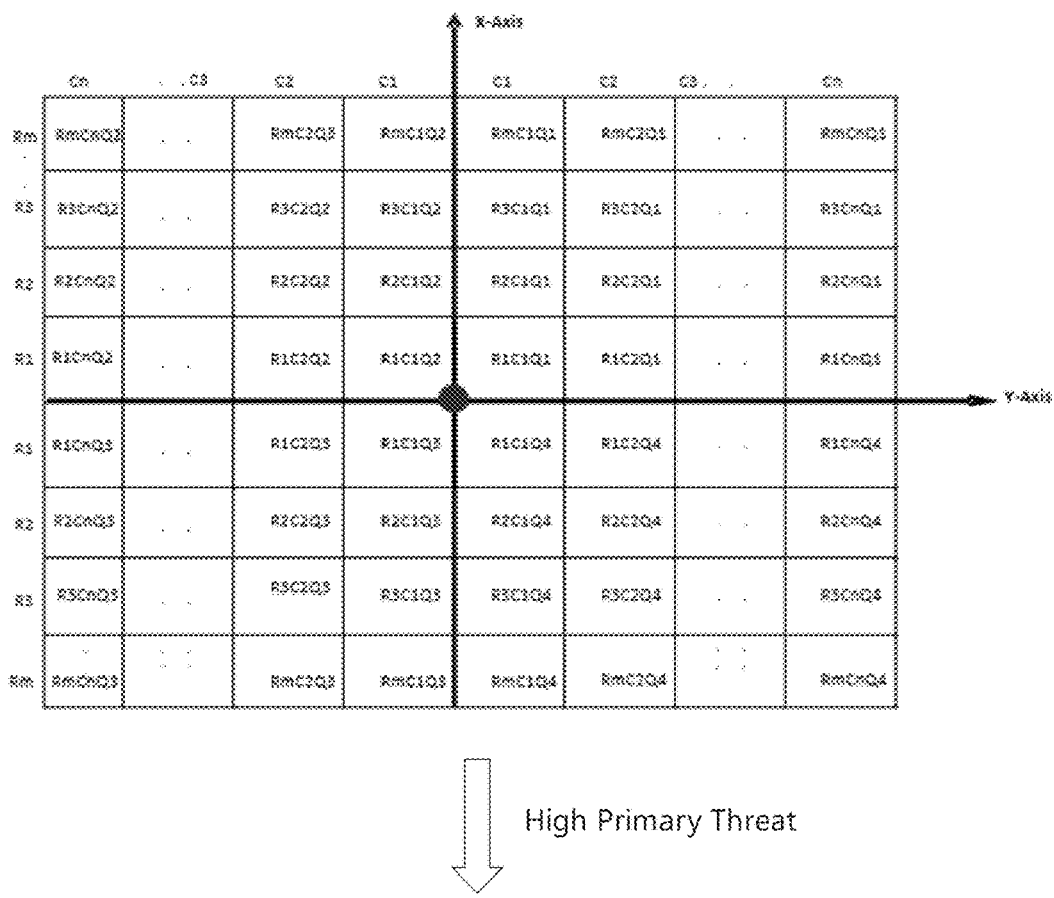
Figure 3F:
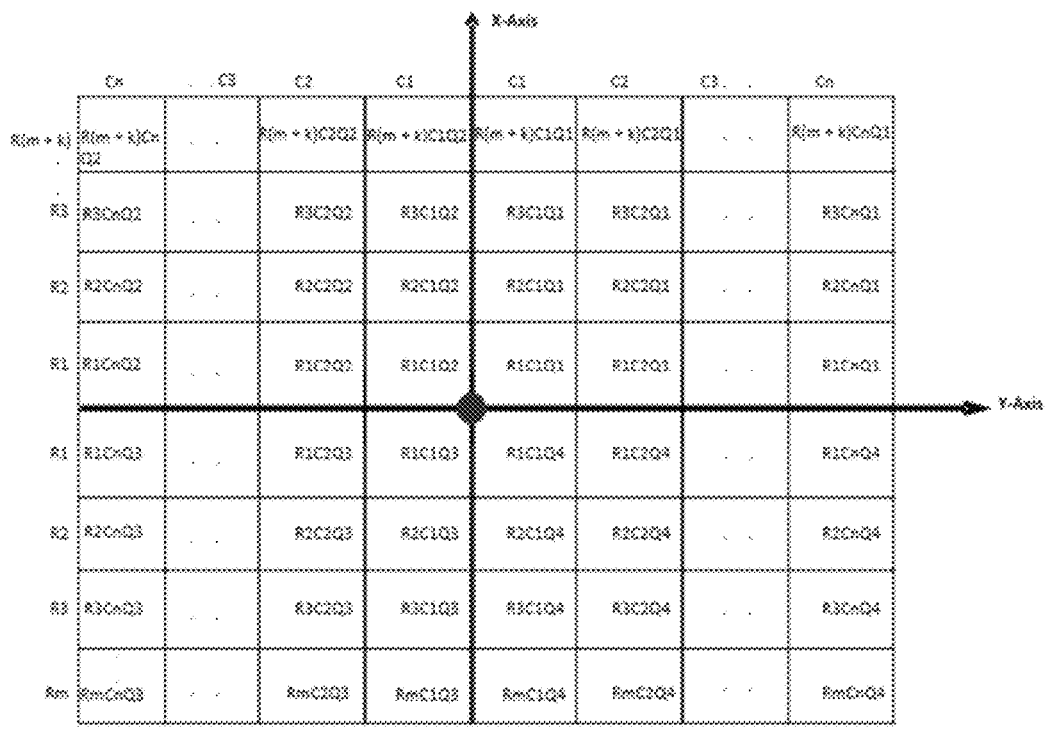

In an embodiment, the grid is updated when the target vehicle with higher threat identified during primary threat analysis. In this case, the length of the grid is increased. FIG. 3F illustrates the updating of the dimensions of the grid based on the determined primary threat.

In an embodiment, the grid is used to extract the following information:
a) time to enter the grid for the target vehicle,
b) time to leave the grid for the target vehicle, and
c) position distribution of the target vehicles and the host vehicle on the grid.

In an embodiment, movement uncertainty of the target vehicles is addressed using a dynamic model when pre-defined path for the host vehicle may not be determined.

In an embodiment, at block 314, probability hypothesis of the target vehicle on grid is computed as:

$$P(H1|D) = (P(D|H1)*P(H1))/P(D)$$

$$P(D) = P(D|H1)*P(H1) + P(D|H2)*P(H2) + P(D|H3)*P(H3) + \ldots + P(D|Hn)*P(Hn)$$

where:

P (H1) is probability of position of target vehicle in Grid H1 (Prior Probability).

P (D) is cumulative probability of target vehicles inside Grid asX and Yco-ordinates.

P (H1|D) is probability of vehicle to be in Grid H1 provided the current Data (Posterior Probability).

P (D|H1) is probability of data provided the vehicle is in Grid H1.

P (Hn) is probability of position of object in GridHn (Prior Probability)

Trajectory Estimation Module 212

In an embodiment, the trajectory estimation module 212 estimates trajectory of target vehicles to determine optimized path of each target vehicle. Further, based on the estimated trajectories of various target vehicles, the dimensions of the grid are updated. The trajectory estimation is performed based on a driver behavior model, which may be developed by analyzing driving parameter, lateral dynamics, longitudinal dynamics and consistency in driving profile of the target vehicle.

Figure 4A:
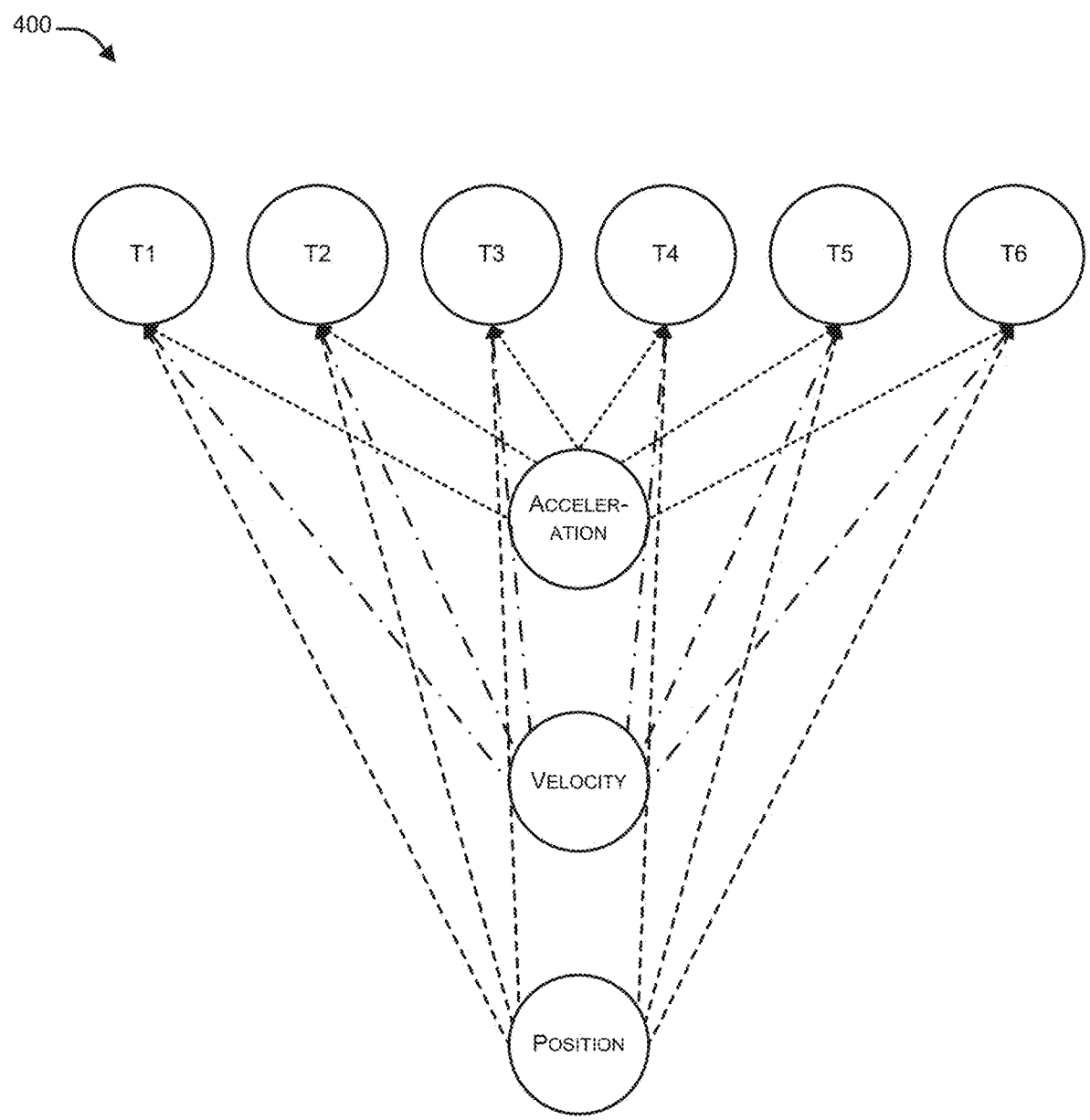
FIG. 4A illustrates an exemplary implementation of a driver behavioral model in accordance with an embodiment of the present disclosure
Figure 4B:
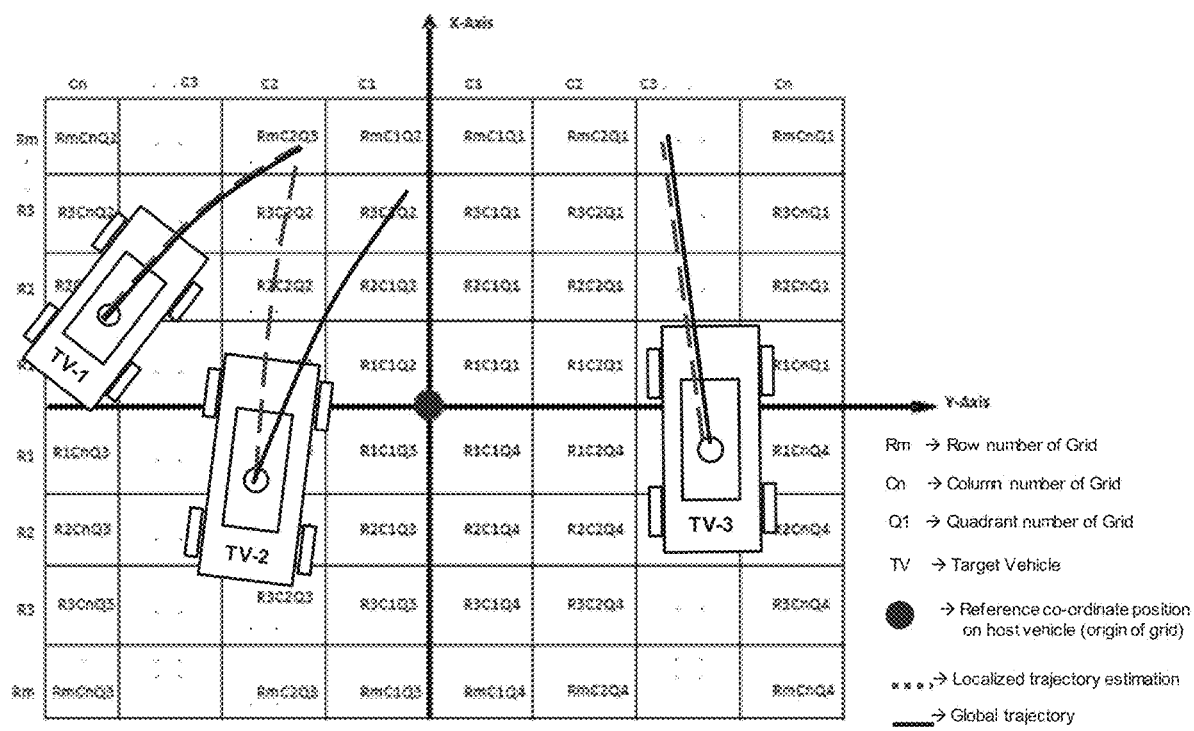
FIG. 4B illustrates exemplary implementation of a trajectory estimation module in accordance with an embodiment of the present disclosure.

In an embodiment, a Hidden Markov Model (HMM) based trajectory prediction is performed where the trajectory is predicted by performing the following steps:
a) estimating trajectory based on driving profile of a driver or driver behavior model used for driving model classification,
b) determining the trajectory of target vehicle based on the HMI model
c) trajectory of the target vehicle within the grid FIGS. 4A-B illustrate exemplary implementations of the trajectory estimation module 212 in accordance with an embodiment of the present disclosure.

In an embodiment, as shown in FIG. 4A, the trajectory of each target vehicle is estimated based on the driver behavior model of respective target vehicle considering position and vehicle dynamics, which may be determined to be driving profile which includes but is not limited to erratic driving, smooth driving, slow driving, fast driving etc.

In an embodiment, the target trajectory is estimated based on the HMM technique, where a Markov estimation technique is used to estimate the trajectory and the trajectory is further tuned based on the driving profile of the target vehicle and the integrated grid map.

In an embodiment, the HMM states are defined based on the driver model classification e.g. states depend on driver behavioral model T1, T2, T3 . . . T6. The optimization of the target vehicle trajectory is based on feedback of the HMM model integrated with global maneuver and is re-iterated to achieve the optimized path of the target vehicle considering the interaction and influence of other target and neighboring vehicles. The priority trajectory of the target vehicle is selected as optimized trajectory for that target vehicle over neighboring vehicles based on closest collision point of target vehicle and then it influences the trajectories across the grid by searching optimized path for the other target vehicles in the grid. Once priority target vehicle path is selected inside the grid, then HMM prediction model iterates for collision free path of priority trajectory for the next target vehicle, and it continues till optimized paths for all target vehicles are determined. The selection of closest collision of the target vehicle is computed with every iteration:

$$\text{Priority trajectories of } N\text{th TV in grid} = (w_{n1}*D_Y + w_{n2}*D_X)*P_{LTN}$$

Where, $P_{LTN}$: Threat probability of localized target trajectory for Nth TV in Grid $D_Y$: Lateral distance from closest collision point with other interactive TV in grid $D_X$: Longitudinal distance from closest collision point with other interactive TV in grid $w_{n1}$, $w_{n2}$: weight age factors Nth TV: Target vehicle of number N In an embodiment, as illustrated in FIG. 4B, the trajectory is integrated in the grid system. The trajectory of the target vehicle is estimated based on contents of the adaptive grid. Upon the grid confirming the consistency of the target vehicle, the target vehicle trajectory is initialized.

In an embodiment, a technique for the grid integration and the trajectory estimation is utilized, which uses the HMM and the driver behavior model providing the space in which traffic vehicle could possibly move for trajectory prediction for the traffic positional data. The trained HMI from the traffic positional data is used to predict the probability of possible trajectory that traffic vehicle will follow.

According to an exemplary implementation as illustrated in FIG. 4B, an initialized localized trajectory based on best probable fit of driver behavioral model of each target vehicle (TV-1, TV 2 and TV-3) is indicated by dotted lines. The global trajectories of each vehicle (as indicated by bold lines) are determined based on the best or subsequent best fit of driver behavioral model determined during global maneuver re-iteration process. As can be observed, initial localized trajectories of TV-1 and TV-2 are interacting and colliding with each other over a period of time. Therefore, based on estimated threat and global maneuver, global trajectory of TV-1 remains unaltered with respect to localized trajectory whereas TV-2 adapts alternative trajectory, which includes subsequent best fit of driver behavioral model, as global trajectory. Further, global trajectory of TV-3 remains unaltered with respect to localized trajectory as there are no observable interactions with other neighboring vehicles over a period of time.

Driver Model Classification Module 214

In an embodiment, the driver model classification module 214 defines a driver behavioral model for each target vehicle selected by analyzing the predicted trajectory of the respective target vehicle. The driver behavior model may be categorized by considering the following (where trajectory with such identified driver behavioral model acts as model classifier):

[T1] translation motion which is proportional to longitudinal velocity

[T2] manoeuvring motion which is proportional to lateral velocity

[T3] braking motion which depends on deceleration

[T4] overtaking motion which depends on lateral movement away from host vehicle lane followed by longitudinal acceleration and thereafter lateral movement towards host vehicle lane

[T5] lane change motion which depends upon only lateral movement to neighboring lane

[T6] unpredictable motion which is not dependent of above motion described in T1, T2 . . . T5.

In an embodiment, the driver model classification module 214 also analyzes historical behavior of the target vehicle, which may depend on the following parameters:
a) manoeuvring motion,
b) driver intension of overtaking,
c) vehicle lane change behavior, and
d) translation motion in a collision free high way.

In an embodiment, learning by the driver model classification module 214 to update driver classification model includes a sequence of motion while manoeuvring. The probability of driver model classification for each target vehicle is established based on pre-defined threshold of each longitudinal and lateral dynamics for each model (e.g. T1, T2, . . . , T6).

The driver model selection for an individual target vehicle is determined based on driver model classification functions for that target vehicle, where highest $J_N$ provides best fit of driver behavioral model and is determined as model classifier:

$$\text{Driver Model Classification function } J_N = T_n \bigg/ \sum_{k=1}^{6} (w_k * T_k)$$

where, $T_k$ is probability of [$T_K$] model of the target trajectory (i.e. T1, T2 . . . T6) for each target vehicle Tn is probability of [Tn] model of the trajectory (i.e. T1, T2 . . . or T6) to compute different $J_N$ for each target vehicle $w_k$ is weight age factor $T_K$ model selection

Global Maneuver Module 216

In an embodiment, the global maneuver module 216 generates a global maneuver model by analyzing motion of each target vehicle based selection of the model classifier for each target vehicle. Further, on generation of the global maneuver model a merge cut-in threat for the host vehicle is computed by performing threat assessment and utilizing the predicted trajectory of the one or more target vehicles.

Figure 5:
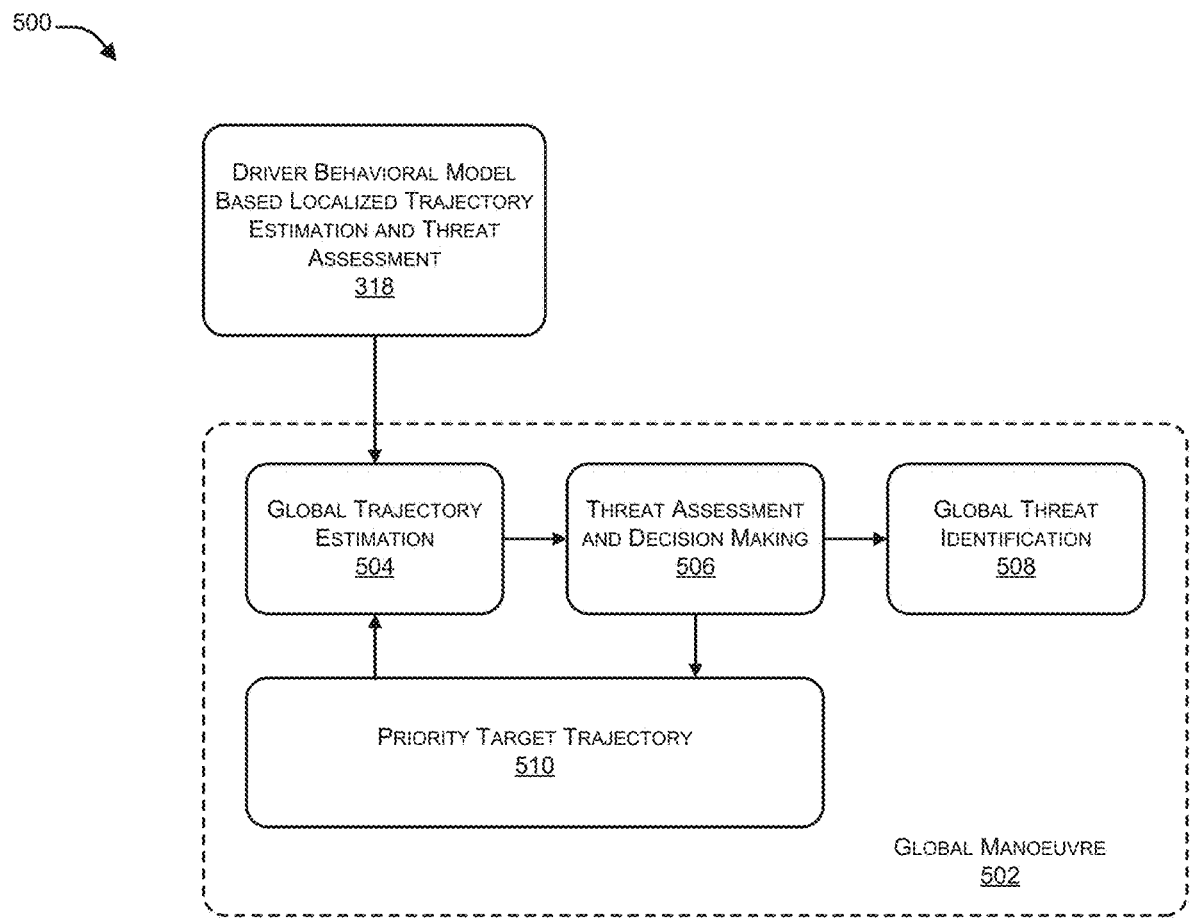
FIG. 5 is a block diagram illustrating exemplary working of a global manoeuvring module in accordance with an embodiment of the present disclosure.

In an embodiment, the global maneuver module 216 performs a global manoeuvring technique according to a block diagram as illustrated in FIG. 5. The technique facilitates prediction of an available path for a host vehicle based on predictive threat assessment and collaborative movement of the target vehicle. The threat of the target vehicle due to neighboring traffic situations or environmental factors or other surrounding vehicle trajectories is considered while making a merge cut-in decision. The potential threat of the target vehicle with respect to surrounding may cause potential braking or unintended manoeuvring. The host vehicle may observe the behavior of the front, rear, adjacent neighboring vehicles apart from target vehicles.

In an embodiment, the global maneuver model is integrated with feedback mechanism to the HMM model as a part of trajectory estimation, which provides optimized predicted path for longer scan of time so as to avoid collision by taking the merge cut-indecision beforehand.

As illustrated in FIG. 5, at block 318, the trajectory and threat probability information are assessed at a localized level. The assessed localized trajectory and threat information is passed as input to a global maneuver block 502. At block 504, the localized trajectory and threat assessment information is received to estimate the global trajectory of the target vehicle, which may be analyzed by the trajectory estimation module 212. Initially, the localized trajectory based on best probable fit of driver behavioral model (i.e. model classifier) of each target vehicle is passed to global maneuver. However, global trajectory of each vehicle may be best or subsequent best fit of driver behavioral model determined during global maneuver i.e. re-iteration and feedback mechanism of HMM for optimised global trajectories of all target vehicles.

In an embodiment, the global manoeuvring technique, at block 506, performs threat assessment and decision making for the vehicles. In an embodiment, the threat assessment of the vehicles are function of the following parameters:
a) estimated threat based on time to collision using prevailing acceleration, speed and distance of target vehicles, and
b) host vehicle longitudinal and lateral accelerations and velocities.

In an embodiment, the lateral and longitudinal dynamics of the host vehicle are provided as input to the block 506 for threat assessment and decision making. The threat classification identifies the threat of the vehicle based on time to collision considering longitudinal and lateral movement of target vehicles.

In an embodiment, the priority target trajectory is performed at block 510 and passed as input to estimate the global trajectory. In priority target trajectory, the optimised trajectory of target vehicles considering neighbourhood and driver model classification is essentially predominant over neighboring vehicle estimated trajectory and such trajectory is selected first.

In global maneuver, the global trajectory of target vehicles is computed considering the interaction of localized vehicle trajectories determined over period—the influence of highly aggressive target vehicles over neighboring vehicle. The vehicle trajectory of more aggressive target vehicle and advances in position is selected first as priority target trajectory and subsequently the trajectory estimation for next target vehicle is re-iterated to find global trajectory for next target vehicle and so on to conclude with optimised global trajectories for all the target vehicles.

In an embodiment, at block 508, global threat identification is performed and is based on probable threat of each target vehicle after final iteration of global maneuver and determination of overall threat probability of the host vehicle during merge cut-in.

Merge management situation classification module 218

In an embodiment, the merge management situation classification module 218 analyzes a condition for change in merge cut-in of target vehicle based on the generated global maneuver model and environmental factors obtained from the information of the surroundings. The merge management situation classification module 218 considers both situation and environmental factors such as:
 a) the host vehicle longitudinal movement or maneuver to other lane,
 b) the rear side lamp indication of the target vehicle to move towards the ego lane,
 c) traffic movement in the merge cut-in scenario where the traffic vehicle adapts the speed reference to speed limit of ego lane in order to have smooth transition to other neighboring lanes, and
 d) merging lane information.

Figure 6:
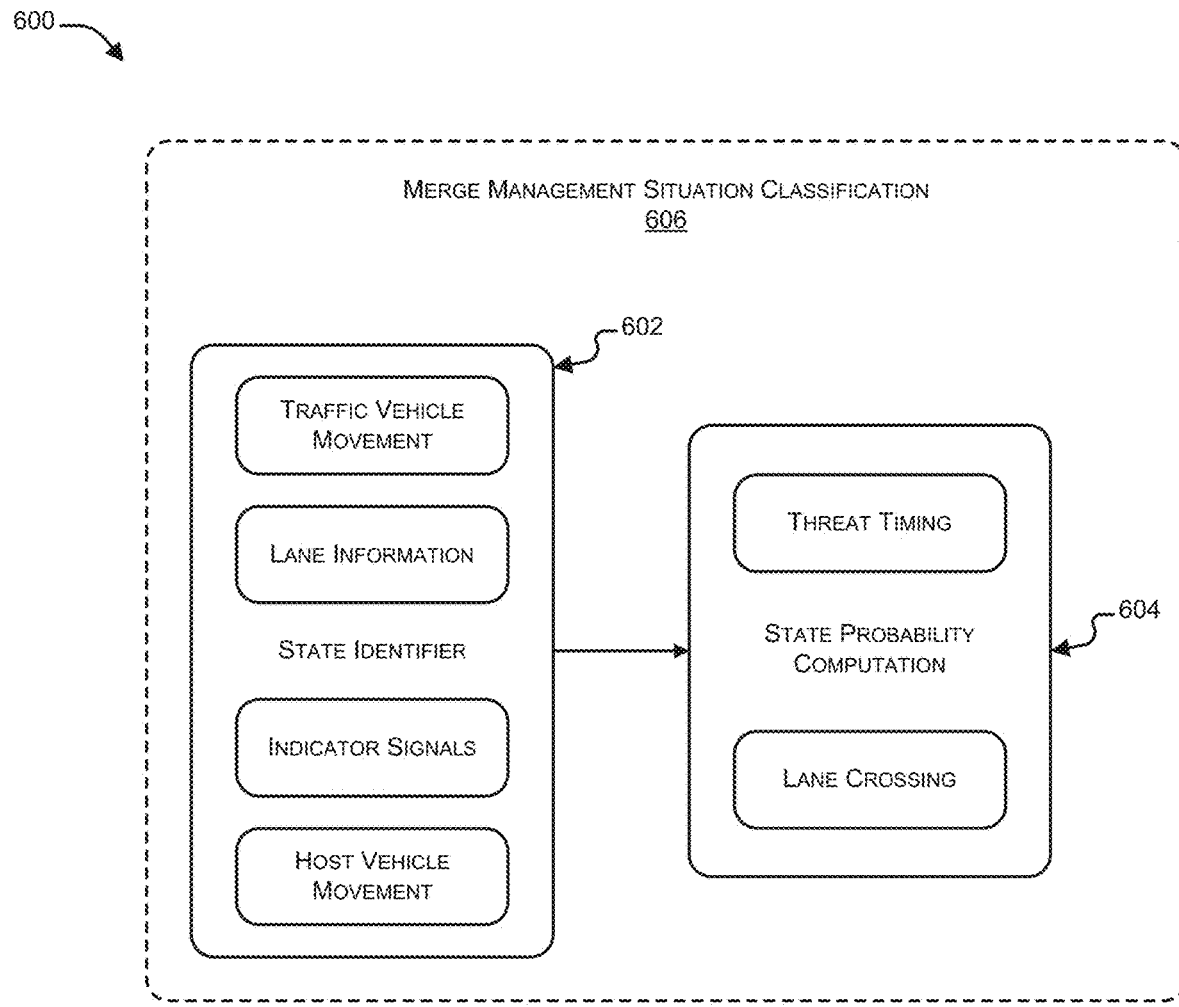
FIG. 6 is a block diagram illustrating exemplary working of a merge management situation classification module in accordance with an embodiment of the present disclosure.

In an exemplary embodiment, as shown in FIG. 6 a situation classification for a merge management scenario is discussed. In an embodiment, it is considered that only a target vehicle can be seen in near surroundings of the host vehicle, i.e. in front, front adjacent, rear, rear adjacent and adjacent without blind spot. At block 602, a state identification is performed and corresponding probability is computed considering predefined range of probabilities for each category of state identifier, which in involves determining and categorizing
 a) lane information indicating target vehicle in ego, adjacent or any others lane,
 b) traffic movement indicating high, medium or low longitudinal movement of traffic,
 c) signals indicating target vehicle for lane change or braking, and
 d) host vehicle movement indicating straight or manoeuvring motion.

At block 604, a state probability is identified to be either in threat timing or in lane crossing or in combination of state which are derived from state identifier. The probability of each state probability is based on weighted probability of each state identifier.

Centralized Risk Management Module 220

In an embodiment, the centralized risk management module 220 assesses a centralized risk and probability hypothesis for merge cut-in based on the generated global maneuver model.

Figure 7:
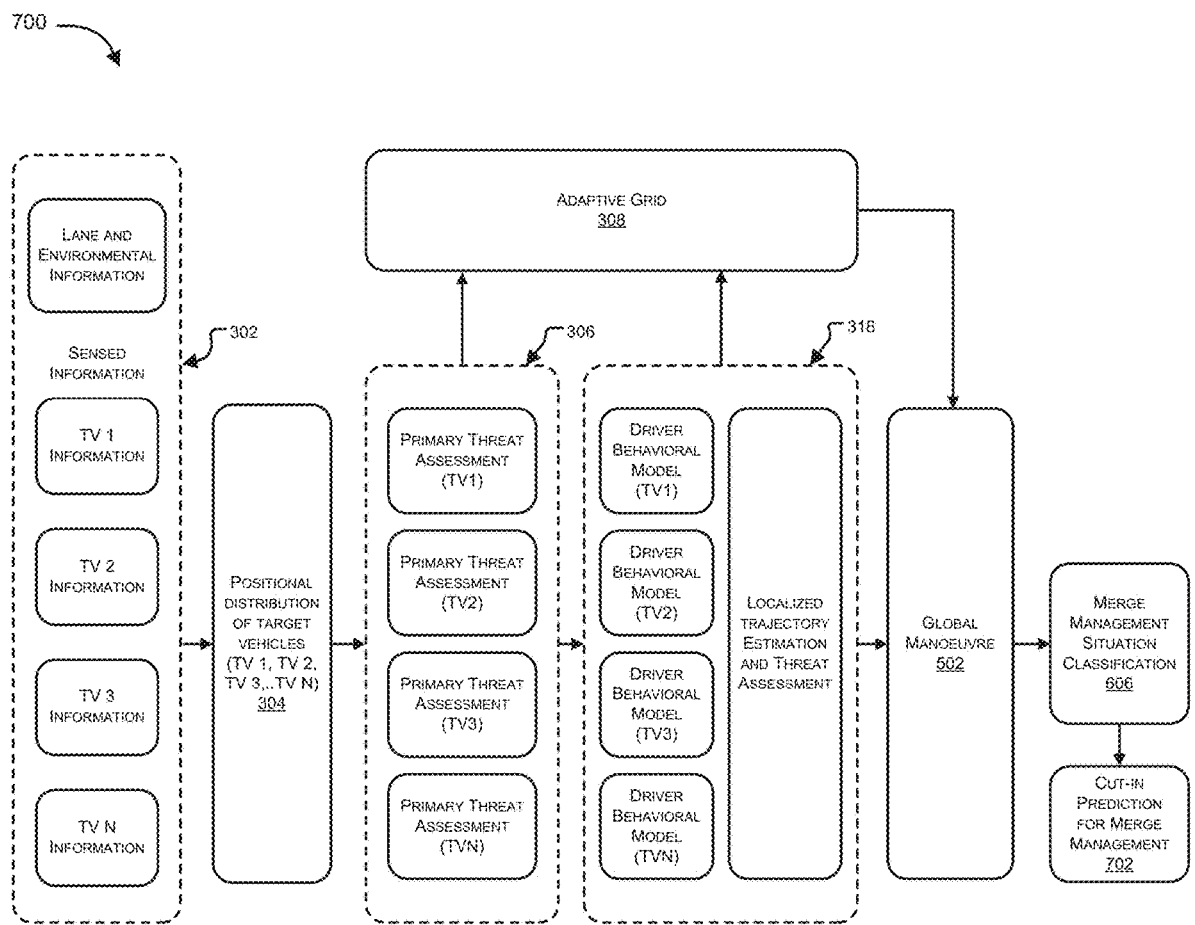
FIG. 7 is a block diagram illustrating exemplary working of a centralized risk management module in accordance with an embodiment of the present disclosure.

In an embodiment, the centralized risk management module 220 facilitates computation of cut-in prediction for merge management as shown in FIG. 7. As illustrated in FIG. 7, at block 302, the target vehicle, lane and environmental information is captured by perception sensors to obtain, at block 304, positional distribution information of target vehicles. The positional distribution information is passed to block 306 to perform the primary threat assessment for each of the target vehicle. The primary threat information is used to update the initialized grid and the size of the grid is adjusted using localized trajectory (obtained at block 318) and threat assessment information (obtained at block 306) and thereby adaptive grid map is generated at block 308. The probability of localized target trajectory for Nth TV is computed using driver model classification for each target and highest probable trajectory of each target vehicle is considered for initial global manoeuver, however the probability of each trajectory for Nth TV is used in priority trajectory. The updated grid is passed as an input to block 502 to perform the global manoeuvring. Also, the determined primary trajectory threat assessment at 306 is forwarded to a driver model classification module at block 318 for localized trajectory determination. The results of the localized trajectories are delivered to the global maneuver block 502 for further processing. Also, the global maneuver receives the updated grid from adaptive grid block 308 as input. The output from block 502 is passed as input for situation classification, at block 606. The situation classification information is used for performing cut-in prediction for merge management. At block 702, cut-in prediction for merge management decides merge cut-in prediction and risk of target vehicle by determining the overall threat probability of all target vehicles to host vehicle based on threat probability and trajectory from global maneuver and further considering that state probabilities of threat timing and lane crossing are within specified threshold limit. In an embodiment, the centralized risk management and the target vehicle with highest threat posed to host vehicle is performed by determining:
 a) trajectory and centralized probability hypothesis considering global maneuver and successive situation classification,
 b) lateral dynamics includes lateral acceleration and velocities, and
 c) longitudinal dynamics includes longitudinal acceleration and velocities.

In centralized risk management, the target with highest threat i.e. most probable to collide with host vehicle is selected target vehicle for immediate control actuation in autonomous or semi-autonomous mode in order to have smooth and collision free movement of host vehicle.

Figure 8:
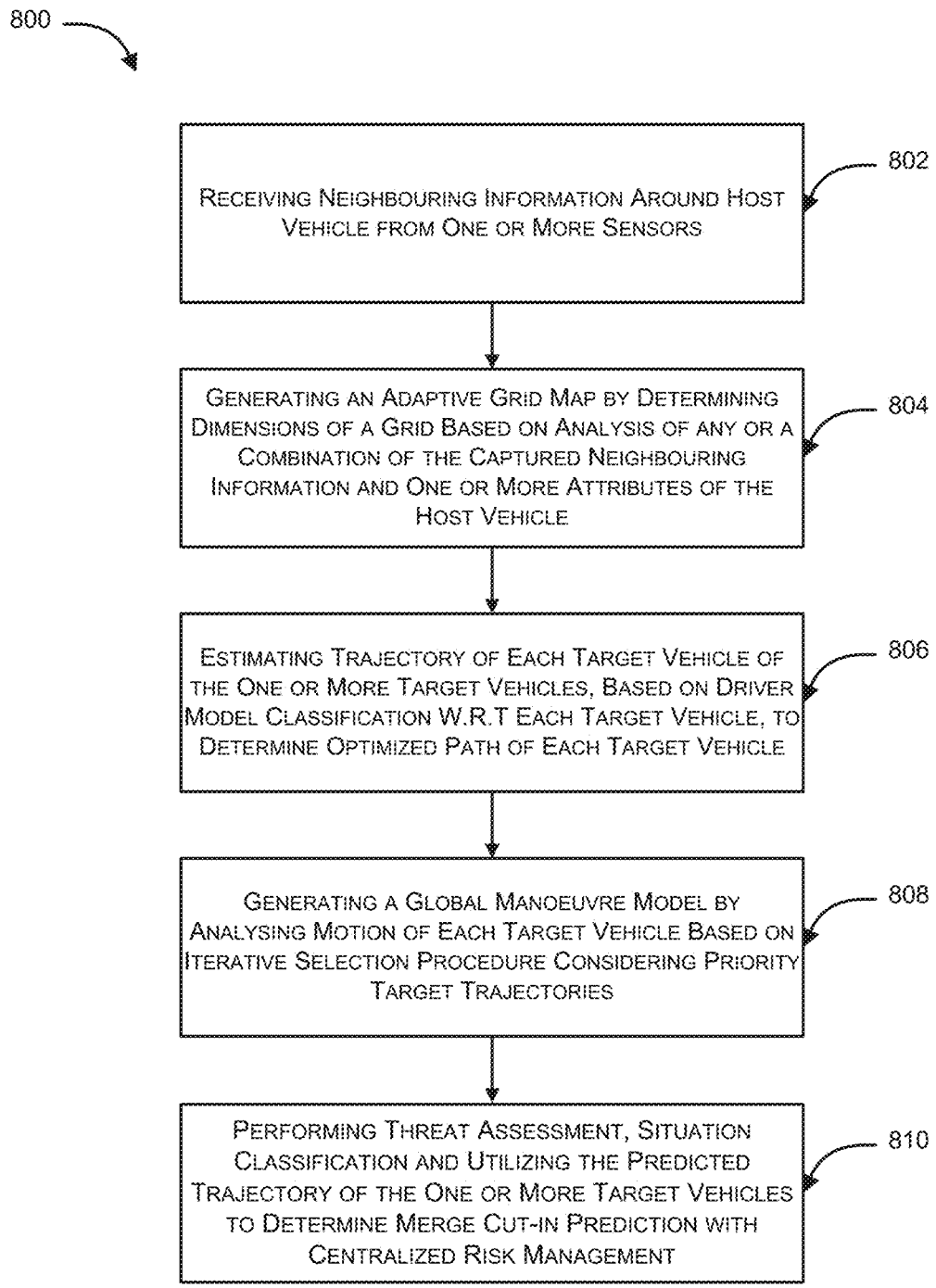
FIG. 8 illustrates an exemplary method for facilitating vehicle merge cut-in prediction in accordance with an embodiment of the present disclosure.

FIG. 8 illustrates an exemplary method for facilitating merge cut-in prediction in accordance with an embodiment of the present disclosure.

In an aspect, the proposed method may be described in general context of computer executable instructions. Generally, computer executable instructions can include routines, programs, objects, components, data structures, procedures, modules, functions, etc., that perform particular functions or implement particular abstract data types. The method can also be practiced in a distributed computing environment where functions are performed by remote processing devices that are linked through a communications network. In a distributed computing environment, computer executable instructions may be located in both local and remote computer storage media, including memory storage devices.

The order in which the method as described is not intended to be construed as a limitation, and any number of the described method blocks may be combined in any order to implement the method or alternate methods. Additionally, individual blocks may be deleted from the method without departing from the spirit and scope of the subject matter described herein. Furthermore, the method may be implemented in any suitable hardware, software, firmware, or combination thereof. However, for ease of explanation, in the embodiments described below, the method may be considered to be implemented in the above described system.

In an aspect, a method includes, at block 802, receiving neighboring information around the host vehicle, which includes information of one or more target vehicles and information of surroundings, in proximity of the host vehicle. The host vehicle is positioned in a lane of a road.

The method further includes, at block 804, generating an adaptive grid map by determining dimensions of a grid based on analysis of any or a combination of the captured neighboring information and one or more attributes of the host vehicle. The attributes of the host vehicle may include steering angle, velocity, acceleration, etc. of the host vehicle.

The method includes, at block 806, estimating trajectory of each target vehicle of the one or more target vehicles, based on driver behavior model classification with respect to each target vehicle, to determine optimized path of each target vehicle. The dimensions of the grid are updated based on said estimation.

The method also includes at block 808, generating a global maneuver model by analyzing motion of each target vehicle based on iterative selection procedure considering priority target trajectories, where a model classifier is selected by analyzing the predicted trajectory of each target vehicle. Further, at block 810 on generation of the global maneuver model, merge cut-in prediction with centralized risk management is determined by performing threat assessment, situation classification and utilizing the predicted trajectory of the one or more target vehicles.

Those skilled in the art would appreciate that the present disclosure deals with complex globalized scenario for the merge management and threat assessment, using an adaptive grid that considers trajectory of the target vehicle to predict most optimized collision free path for the target vehicles. The techniques disclosed by various embodiments of the present disclosure aid in providing an adaptive grid merge cut-in model that enables adaptation of a grid structure based on the vehicle's state and threat. The novel approach of probability hypothesis on the grid brings the advantage of computation of the vehicle's threat based on probability. Further, various embodiments provide a central risk management for performing the merge cut-in based on information of the neighboring vehicles and hypothesis based environment.

As elaborated above, the proposed system uses several unique features. For example, an adaptive grid mapping is provided that focuses on map creation of the neighbourhood based on information of the vehicles collected from multiple sensors. The grid formation is supported by probabilistic estimation of the trajectory of the target vehicles in adjacent lanes that create a threat to the host vehicle during lane changing. Assessment of the driver behavioral model deals with situation assessment of the road and traffic conditions and includes the driving profile, manoeuvring objective, vehicle dynamics and motion profile while capturing and considering the traffic rules of the place. Further the disclosure focuses on providing the global manoeuvring technique for decision making, based on road condition, global traffic condition and competitive environment of the multiple lanes. Furthermore, the disclosure provides a merge management situation classification that analyzes the feasible condition for the merge cut-in while considering situation and environmental factors. Also, a cut-in prediction associated with centralized risk management for merge cut-in is provided.

As used herein, and unless the context dictates otherwise, the term "coupled to" is intended to include both direct coupling (in which two elements that are coupled to each other or in contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While some embodiments of the present disclosure have been illustrated and described, those are completely exemplary in nature. The disclosure is not limited to the embodiments as elaborated herein only and it would be apparent to those skilled in the art that numerous modifications besides those already described are possible without departing from the inventive concepts herein. All such modifications, changes, variations, substitutions, and equivalents are completely within the scope of the present disclosure. The inventive subject matter, therefore, is not to be restricted except in the spirit of the appended claims.

The present disclosure provides a system and method that focuses on evaluating merge cut-in by considering complexity of the cut-in due to incidence or threat of target vehicles.

The present disclosure provides a system and method for addressing trajectory and risk management globally and determining implication of target vehicle trajectory due to threat caused by motion of other neighboring vehicles.

The present disclosure provides a system and method for facilitating a complex globalized scenario of merge management and its prediction using an adaptive grid.

The present disclosure provides a system and method for providing a global maneuver that provides pre-assessment of trajectory of a target vehicle and predicts most optimized collision free path for the target vehicles over a period which help to decide merge management based on the selected target.

What is claimed is:

1. A prediction system implemented in a host vehicle, said system comprising:
   an input unit comprising one or more sensors to capture neighboring information of the host vehicle, the neighboring information comprising information of one or more target vehicles and information of surroundings, in proximity of the host vehicle, wherein the host vehicle is positioned in a lane of a road; and
   a processing unit comprising a processor coupled with a memory, the memory storing instructions executable by the processor to:
   receive the captured neighboring information from the input unit;
   generate a grid map by determining dimensions of a grid based on analysis of any or a combination of the captured neighboring information and one or more attributes of the host vehicle;
   estimate a trajectory of each target vehicle of the one or more target vehicles, based on a driver behavior model of each target vehicle, to determine an optimized path of each target vehicle, wherein the dimensions of the grid are updated based on said estimation; and generate a global maneuver model by analyzing motion of each target vehicle based on selection of a model classifier for each target vehicle, wherein the model classifier is selected by analyzing the trajectory estimated for each target vehicle, and wherein on generation of the global maneuver model, a merge cut-in threat for the host vehicle is computed by performing threat assessment and utilizing the trajectory of the one or more target vehicles.

2. The prediction system of claim 1, wherein the processor further analyzes a condition for a change in the merge cut-in threat of the target vehicles based on the generated global maneuver model and environmental factors obtained from the information of the surroundings.

3. The prediction system of claim 1, wherein the processor further assesses a centralized risk management for merge cut-in based on the generated global maneuver model.

4. The prediction system of claim 1, wherein the processor further performs adaptive grid mapping and dynamic grid sizing to dynamically alter shape and size of the grid based on the one or more attributes of the host vehicle and assess threat by utilizing the captured neighboring information.

5. The prediction system of claim 1, wherein the driver behavior model for each target vehicle is developed by analyzing one or more of a driving parameter, lateral dynamics, longitudinal dynamics, or consistency in driving profile of the target vehicles.

6. The prediction system of claim 1, wherein estimation of trajectory of each target vehicle is further based on assessing threat based on one or more of a neighboring situation, environmental factors, or estimated trajectories of other target vehicles, wherein the neighboring situation, the environmental factors, or the estimated trajectories of other target vehicles are determined by analyzing the neighboring information.

7. The prediction system of claim 1, wherein a length of the grid is computed based on a longitudinal velocity and a longitudinal acceleration of the host vehicle, a width of the grid is computed based on a lateral velocity and a lateral acceleration of the host vehicle, and a shape of the grid is computed based on a lane of the host vehicle and an estimated path of the host vehicle.

8. The prediction system of claim 1, wherein the processor estimates a trajectory of each target vehicle using a Hidden Markov Model (HMM) by:
defining HMM states for the target vehicle based on driver behavior model of the target vehicle;
iteratively optimizing path of the target vehicle based on feedback of the HMM model from the global maneuver model and influence of other target vehicles; and
selecting a priority trajectory of the target vehicle as optimized trajectory to be maintained across the grid map for searching optimized path for other target vehicles of the one or more target vehicles in the grid map.

9. The prediction system of claim 8, wherein selection of the model classifier is performed based on one or more of a translation motion, a maneuvering motion, an overtaking motion, a lane change motion, or an unpredictable motion of the target vehicle.

10. The prediction system of claim 1, wherein the threat assessment comprises assessment of a threat of collision due to a merge cut-in of any of the one or more target vehicles or the host vehicle.

11. A method, carried out according to instructions stored in a computer implemented in a host vehicle, comprising:
receiving neighboring information of the host vehicle from one or more sensors, the neighboring information comprising information of one or more target vehicles and information of surroundings, in proximity of the host vehicle, wherein the host vehicle is positioned in a lane of a road;
generating a grid map by determining dimensions of a grid based on analysis of any or a combination of the captured neighboring information and one or more attributes of the host vehicle;
estimating a trajectory of each target vehicle of the one or more target vehicles, based on a driver behavior model of each target vehicle, to determine an optimized path of each target vehicle, wherein the dimensions of the grid are updated based on said estimation; and
generating a global maneuver model by analyzing motion of each target vehicle based on selection of a model classifier for each target vehicle, wherein the model classifier is selected by analyzing the trajectory estimated for each target vehicle, and wherein on generation of the global maneuver model, a merge cut-in threat for the host vehicle is computed by performing threat assessment and utilizing the trajectory of the one or more target vehicles.

12. The method of claim 11, further comprising analyzing a condition for a change in the merge cut-in threat of the target vehicles based on the generated global maneuver model and environmental factors obtained from the information of the surroundings.

13. The method of claim 11, further comprising assessing a centralized risk management for merge cut-in based on the generated global maneuver model.

14. The method of claim 11, further comprising performing adaptive grid mapping and dynamic grid sizing to dynamically alter shape and size of the grid based on the one or more attributes of the host vehicle and assess threat by utilizing the captured neighboring information.

15. The method of claim 11, wherein the driver behavior model for each target vehicle is developed by analyzing one or more of a driving parameter, lateral dynamics, longitudinal dynamics, or consistency in driving profile of the target vehicles.

16. The method of claim 11, wherein estimation of trajectory of each target vehicle is further based on assessing threat based on one or more of a neighboring situation, environmental factors, or estimated trajectories of other target vehicles, wherein the neighboring situation, the environmental factors, or the estimated trajectories of other target vehicles are determined by analyzing the neighboring information.

17. The method of claim 11, wherein a length of the grid is computed based on a longitudinal velocity and a longitudinal acceleration of the host vehicle, a width of the grid is computed based on a lateral velocity and a lateral acceleration of the host vehicle, and a shape of the grid is computed based on a lane of the host vehicle and an estimated path of the host vehicle.

18. The method of claim 11, further comprising estimating a trajectory of each target vehicle using a Hidden Markov Model (HMM) by:
defining HMM states for the target vehicle based on driver behavior model of the target vehicle;
iteratively optimizing path of the target vehicle based on feedback of the HMI model from the global maneuver model and influence of other target vehicles; and selecting a priority trajectory of the target vehicle as optimized trajectory to be maintained across the grid map for searching optimized path for other target vehicles of the one or more target vehicles in the grid map, wherein selection of the model classifier is performed based on one or more of a translation motion, a manuvering motion, an overtaking motion, a lane change motion, or an unpredictable motion of the target vehicle.

19. The method of claim 11, wherein the threat assessment comprises assessment of a threat of collision due to a merge cut-in of any of the one or more target vehicles or the host vehicle.

20. A non-transitory computer-readable medium storing instructions that, when executed by a processor, cause the processor to:

receive neighboring information of the host vehicle from one or more sensors, the neighboring information comprising information of one or more target vehicles and information of surroundings, in proximity of the host vehicle, wherein the host vehicle is positioned in a lane of a road;

generate a grid map by determining dimensions of a grid based on analysis of any or a combination of the captured neighboring information and one or more attributes of the host vehicle;

estimate a trajectory of each target vehicle of the one or more target vehicles, based on a driver behavior model of each target vehicle, to determine an optimized path of each target vehicle, wherein the dimensions of the grid are updated based on said estimation; and generate a global maneuver model by analyzing motion of each target vehicle based on selection of a model classifier for each target vehicle, wherein the model classifier is selected by analyzing the trajectory estimated for each target vehicle, and wherein on generation of the global maneuver model, a merge cut-in threat for the host vehicle is computed by performing threat assessment and utilizing the trajectory of the one or more target vehicles.

* * * * *